US006837112B2

(12) United States Patent
Ferran et al.

(10) Patent No.: US 6,837,112 B2
(45) Date of Patent: Jan. 4, 2005

(54) CAPACITANCE MANOMETER HAVING A RELATIVELY THICK FLUSH DIAPHRAGM UNDER TENSION TO PROVIDE LOW HYSTERESIS

(75) Inventors: Robert J. Ferran, San Diego, CA (US); Daniel M. Rohrbach, San Diego, CA (US); Michael Oswald, San Diego, CA (US)

(73) Assignee: Stec Inc. (JP)

( * ) Notice: Subject to any disclaimer, the term of this patent is extended or adjusted under 35 U.S.C. 154(b) by 30 days.

(21) Appl. No.: 10/249,238

(22) Filed: Mar. 25, 2003

(65) Prior Publication Data

US 2004/0187589 A1 Sep. 30, 2004

Related U.S. Application Data

(60) Provisional application No. 60/456,975, filed on Mar. 22, 2003.

(51) Int. Cl.[7] .................................................. G01L 9/12
(52) U.S. Cl. ........................................................ 73/718
(58) Field of Search ........................... 73/718, 724, 747, 73/749, 750; 361/283.1, 283.2, 283.3, 283.4

(56) References Cited

U.S. PATENT DOCUMENTS

| | | |
|---|---|---|
| 2,751,530 A | 6/1956 | Armstrong |
| 2,829,520 A | 4/1958 | Stanton |
| 3,557,621 A | 1/1971 | Ferran |
| 3,747,042 A | 7/1973 | Sheldon |
| 3,783,693 A | 1/1974 | Paros |
| 3,965,746 A | 6/1976 | Rabek |
| 4,141,252 A * | 2/1979 | Lodge ..................... 73/724 |
| 4,262,540 A | 4/1981 | Tamai et al. |
| 4,380,041 A | 4/1983 | Ho |
| 4,398,194 A | 8/1983 | Johnston |
| 4,587,851 A | 5/1986 | Mortberg |
| 4,691,574 A | 9/1987 | Delatorre |
| 4,703,658 A | 11/1987 | Mrozack, Jr. et al. |
| 4,823,603 A | 4/1989 | Ferran et al. |
| 4,864,463 A | 9/1989 | Shkedi et al. |
| 4,974,117 A | 11/1990 | Irwin |
| 5,249,469 A | 10/1993 | Jonsson et al. |
| 5,271,277 A | 12/1993 | Pandorf |
| 5,343,757 A | 9/1994 | Tate |
| 5,349,865 A | 9/1994 | Kavli et al. |
| 5,396,803 A | 3/1995 | Ferran |
| 5,452,613 A | 9/1995 | Bills et al. |
| 5,515,711 A | 5/1996 | Hinkle |
| 5,684,245 A | 11/1997 | Hinkle |
| 5,911,162 A | 6/1999 | Denner |
| 5,920,015 A | 7/1999 | Hallberg et al. |
| 5,939,639 A | 8/1999 | Lethbridge |
| 5,942,692 A | 8/1999 | Haase et al. |
| 5,965,821 A | 10/1999 | Grudzien |
| 6,019,002 A | 2/2000 | Lee |
| 6,029,525 A | 2/2000 | Grudzien |
| 6,568,274 B1 | 5/2003 | Lucas et al. |

* cited by examiner

*Primary Examiner*—William Oen
(74) *Attorney, Agent, or Firm*—Jan P. Weir

(57) ABSTRACT

A capacitance diaphragm gauge (CDG) for measuring pressure includes a flush diaphragm mounted to a body structure via a shim or other raised perimeter portion. The diaphragm and the shim are welded to the body structure while the diaphragm is maintained at an elevated temperature. Contraction of the diaphragm as it cools pretensions the diaphragm to substantially reduce hysteresis effects. An electrode advantageously includes two portions with one portion providing excellent bonding characteristics and the other portion having temperature characteristics corresponding to the body structure and the diaphragm. An alternative CDG includes two identical electrodes with a first electrode positioned proximate to the center of the diaphragm and with a second electrode positioned proximate to the perimeter of the diaphragm. The second electrode provides a second capacitance signal that is used to compensate for changes in capacitance between the diaphragm and the first electrode caused by temperature changes.

6 Claims, 6 Drawing Sheets

CAPACITANCE MANOMETER HAVING A RELATIVELY THICK FLUSH DIAPHRAGM UNDER TENSION TO PROVIDE LOW HYSTERESIS

CROSS REFERENCE TO A RELATED APPLICATION

This application is based on Provisional Patent application No. 60/456,975, filed Mar. 22, 2003 and entitled "CAPACITANCE MANOMETER HAVING A RELATIVELY THICK FLUSH DIAPHRAGM UNDER TENSION TO PROVIDE LOW HYSTERESIS".

BACKGROUND OF INVENTION

1. Field of the Invention

The present invention is in the field of pressure transducers having a variable capacitance between a diaphragm exposed to the pressure and a fixed electrode.

2. Description of the Related Art

Capacitance diaphragm gauges (CDGs) have been used for many years to measure pressures. CDGs are particularly useful for measuring very low pressures (e.g., much lower than atmospheric pressure) such as pressures in an evacuated system (e.g., a semiconductor fabrication system). A CDG produces an electrical output that represents a measure of a pressure input with respect to a reference pressure.

Basically, an exemplary CDG includes at least one electrode that is supported on a suitable support structure. The electrode is positioned in close proximity to a flexible diaphragm in a sealed and evacuated cavity. The diaphragm is positioned in the device so that one face of the diaphragm (the pressure face) is exposed to an unknown pressure to be measured. The electrode is proximate to the opposite face of the diaphragm (the electrode face). The unknown pressure on the pressure face is measured relative to a reference pressure on the electrode face. The reference pressure is substantially constant within the sealed and evacuated cavity. The diaphragm and the electrode comprise the two plates of a variable capacitor that has a capacitance the varies in response to deflections of the diaphragm caused by pressure variations.

In many applications, the CDG is positioned within a suitable housing of a pressure-measuring device with the pressure face of the diaphragm exposed to the unknown pressure via suitable passages. Alternatively, the pressure face of the diaphragm may be exposed directly to the unknown pressure. For example, the CDG may be mounted such that the pressure face of the diaphragm is in a gas flow conduit, in which case it is preferable that the diaphragm and other portions of the CDG do not extend into the gas flow to partially block the gas flow or to cause turbulence in the gas flow. If no portion of the CDG extends beyond the pressure face of the diaphragm, the pressure face can be mounted substantially flush with an inner wall of the gas flow conduit. A CDG having such a configuration is called a flush diaphragm design. One skilled in the art will appreciate that a flush diaphragm CDG can be welded into a housing to make a more general device. On the other hand, a CDG that does not have flush diaphragm generally is not convertible to be used in applications requiring a flush diaphragm device because the outer support structures for the diaphragm extend beyond the pressure face of the diaphragm.

CDGs having flush diaphragms are known in the art. For example, a first type of flush diaphragm CDG is machined out of a solid block of suitable material to leave a thin layer of material at one end of the block to form the diaphragm. In some cases, the material may be heat treated for certain desired results or because of the properties of the material.

Another known type of flush diaphragm CDG is called corrugated diaphragm CDG. The corrugated diaphragm has waves formed into the surface to cause extra material to be present in order to produce more linear deflections in response to the applied pressure. The diaphragm for this type is usually welded into place.

A third type of flush diaphragm CDG has a diaphragm formed from a thin material. The thin material is highly tensioned in some manner and is welded in place.

Much emphasis is placed on the hysteresis characteristics of a finished pressure measuring device. Hysteresis refers to the differences between the output of the transducer on approaching a given pressure from different directions (i.e., approaching the given pressure from higher pressures as the unknown pressure is decreasing versus approaching the given pressure from lower pressures as the unknown pressure is increasing). Although the same output value should be generated for the given pressure irrespective of the previous pressure, hysteresis effects may cause the output value to be too high when the given pressure is approached from a higher pressure and may cause the output value to be to low when the given pressure is approached from a lower pressure.

The maximum value of the hysteresis error is usually at the midpoint of the pressure excursions. An excursion from zero pressure to full-scale pressure is the maximum normal excursion. Abnormal excursions can cause greater errors. Since hysteresis errors depend at least in part on the magnitude of the pressure excursions, the hysteresis errors are usually unpredictable and are therefore major concerns. In contrast, other errors, such as, for example, linearity or temperature errors, are more correctable because they are repeatable and therefore predictable.

A diaphragm subjected to pressure has to carry the pressure load. The difference between the pressures applied on the opposite faces of the diaphragm causes a deflection of the diaphragm. The electrode face of diaphragm acts as one plate of a variable capacitor having the electrode as the other plate of the capacitor. If additional electrodes are included, multiple capacitors are formed with the electrode face of the diaphragm forming one plate of each capacitor. The deflection of diaphragm moves the diaphragm closer to or farther from the electrode, thus varying the capacitance. The capacitance is determined in a suitable conventional manner to provide a measurable quantity responsive to the pressure applied to the pressure face of the diaphragm.

In order to produce repeatable measurements of the unknown pressure, the diaphragm deflection should occur with a minimum of hysteresis. That is, when the pressure returns to the previous magnitude, the diaphragm should return to its previous state of deflection regardless of whether the pressure initially increased and then decreased or initially decreased and then increased.

Reduction of hysteresis has been accomplished by carrying the load in tension. It has been found that smaller changes in the magnitude of the tension in response to pressure changes results in less hysteresis and thus results in greater measurement accuracy. One problem with high pressure measuring devices is to keep the deflection small enough by having a pretension carrying the load.

Many techniques have been used to pretension diaphragms, particularly for diaphragms in low pressure CDGS; however, the techniques used for high pressure diaphragms have proven to be very limited, and as the devices have become smaller, the techniques have become even more limited. One technique that has been used to pretension a diaphragm is to heat the diaphragm prior to welding the diaphragm to the body of the CDG so that when the diaphragm cools, the diaphragm will shrink and develop tension. Previous attempts to do pretension a diaphragm with this technique consisted of placing the diaphragm in contact with a heated platen. This technique causes the whole fixture to become hot and thus causes a significant uncertainty in results as sequential units are processed. Such a technique also presents problems in maintaining good thermal contact between the diaphragm and the platen, which again causes the resulting tension on the diaphragm to be nonrepeatable.

The support structure in a typical CDG is formed as one piece with a portion of the structure proximate to the diaphragm providing the function of a shim that spaces the diaphragm away from the electrode in its rest or zero position. Forming the shim as part of the CDG body is a very expensive and unrepeatable way to obtain the spacing between the diaphragm and the electrode. For example, the thin lip of the shim needs to be machined in with great care to provide the tolerances that are necessary to produce a repeatable initial zero capacitance. The shim is under great pressure when the diaphragm deflects. Therefore, the shim needs to be extremely hard. In order to obtain the required hardness with the one-piece design, the part is heat-treated after machining. The heat-treating may cause the part to warp and to lose the spacing accuracy that is required for precision measurements.

SUMMARY OF INVENTION

Embodiments in accordance with the present invention provide a capacitance diaphragm gauge (CDG) having a flush diaphragm with low hysteresis characteristics. The CDG has a simple structure that can be repeatably manufactured in an affordable manner.

One aspect of embodiments in accordance with the present invention is a capacitance diaphragm gauge (CDG) having a flush diaphragm mounted on the body of the CDG by a technique that produces a very high pretension on the diaphragm with a magnitude approximately half the magnitude of the ultimate strength of the diaphragm material. Such a pretension can be shown to be the optimum operating point that minimizes the bending stress of the diaphragm relative to the allowable stress. Since the bending stress on the diaphragm is a primary cause of hysteresis, the hysteresis is minimized by this technique.

In particular, in embodiments described herein, heat is applied to the diaphragm prior to welding the diaphragm to the CDG body. After the welding is completed, the diaphragm is pretensioned as the diaphragm shrinks while cooling.

In a preferred embodiment, the diaphragm is illuminated with high intensity radiation. For example, the radiation may be provided by a laser or other suitable source. In one particular embodiment, the radiation is generated by a halogen lamp suitably positioned to irradiate a face of the diaphragm. The radiation source is turned on for a few seconds before beginning the welding process and remains on during the welding process. The radiation is caused to selectively heat the diaphragm by raising the emissivity of the diaphragm relative to its surroundings to increase the absorption of the radiation. By increasing the temperature of the diaphragm relative to the surrounding material of the CDG body, the diaphragm expands relative to the surrounding material prior to the welding process. The diaphragm is welded while it is expanded to cause the diaphragm to become pretensioned when it is cooled after the welding is completed.

The radiation intensity from the laser, the halogen lamp or other radiation source can be controlled adequately to provide a repeatable temperature so that the pretensioning produces repeatable stress of approximately one half the ultimate stress.

An ordinary metal has a very low emissivity and thus has very low absorption. Substantially all of the incident radiation is reflected, and the small amount retained will increase the temperature an inadequate amount. Furthermore, the temperature increase is not likely to produce repeatable results. In accordance with the particularly preferred embodiment, the emissivity of the surface of the diaphragm is increased by coating the surface with carbon or another suitable substance. Preferably, the surface of the diaphragm is coated in a manner that permits the diaphragm to be cleaned easily after the welding process is completed. For example, carbon black (e.g., soot) has been found to be suitable to increase the emissivity and to be easily removed after the processing is completed. In one particular embodiment, the carbon black is applied by exposing the pressure surface of the diaphragm to an oxidizing flame of butane (e.g., from a lighter or the like). The oxidizing flame deposits a thin layer of carbon on the pressure surface. The thin carbon layer absorbs radiation to cause the diaphragm to heat rapidly while the other components remain relatively cool. The carbon layer washes off easily without requiring abrasive cleaning.

The techniques described herein are used to produce CDGs having separate, thin unmachined diaphragms. The diaphragms are easily heat treated to the optimum properties in contrast to the very expensive process of machining the diaphragm and support out of one piece and then trying to heat treat the diaphragm after machining without warping the diaphragm. The process described herein allows a diaphragm to be installed on the support in a cost efficient and optimum manner and provides outstanding performance with respect to the deflection characteristics of the diaphragm. In particular, the diaphragm has a low hysteresis.

Unlike prior devices with a one-piece body structure having the shim formed as a part of the body structure, embodiments in accordance with the present invention include a separate shim that can be heat treated separately. Like the diaphragm, the shim does not need to be machined. Therefore, the shim does not warp or change its thickness in any way. Thus, optimum performance is obtainable with low-cost parts that are easy to manufacture with repeatable characteristics. As a result, the support structure (e.g., the body of the CDG) in accordance with the embodiments described herein is a simple mass producible part.

In order to weld the diaphragm while heated, the diaphragm and the shim are fixed between an upper pressure nose and a lower support surface of a hydraulic arbor press while the heated diaphragm and the shim are welded to the CDG body. In non-flush diaphragm configurations, an outer support ring is also welded during the same process and remains as part of the CDG. In order to obtain a flush diaphragm in accordance with the embodiments described herein, the diaphragm rests on a reusable support jig during the welding process. The support jig is positioned on the lower support surface of the arbor press, and the upper pressure nose is forced against the rear surface of the CDG body. Pressure from the arbor press secures the diaphragm to the CDG body during the welding process. The support jig comprises a high temperature (e.g., refractory) material that does not melt during the welding process and thus does not become attached to the diaphragm. Exemplary refractory materials, such as, for example, tantalum and silicon carbide, are suitable for the support jig.

Alternative embodiments in accordance with the present invention include a two-piece electrode that provides a stable capacitance under variations of temperature in contrast to known single-piece electrode designs in the past. The expansion of an electrode in response to temperature increases the rest capacitance. The increase in rest capacitance may be cancelled by increasing the space between diaphragm and the electrode. The increased space can be provided by making the net expansion of the single electrode smaller than the support path through the shim. This is accomplished in preferred embodiments using a two-piece electrode. A two-piece electrode suitable for high pressure measurements comprises an outer portion comprising titanium or titanium alloy. The titanium or titanium alloy material has high strength bonding characteristics that withstand the great forces of overpressure that are unique to a high pressure CDG. The inner portion of the two-piece electrode is joined to the outer portion by welding (or by another suitable manner that joins the pieces as if they were welded). For example, 300 series stainless steels have been found to be suitable for use as the inner portion. In an embodiment described herein, the inner portion advantageously comprises nickel. Alternatively, suitable performance can be achieved by a single-piece electrode comprising titanium or a titanium alloy.

Further embodiments in accordance with the present invention include a second electrode positioned proximate to the perimeter of the diaphragm to compensate for the expansion of the space between the electrode and the diaphragm by providing a second capacitance measurement signal that can be processed to cancel out the effect of the expansion.

BRIEF DESCRIPTION OF DRAWINGS

The foregoing and other features of embodiments of the present invention are described below in connection with the accompanying drawing figures in which.

DETAILED DESCRIPTION OF THE PREFERRED EMBODIMENTS

Figures 1A, 1B:
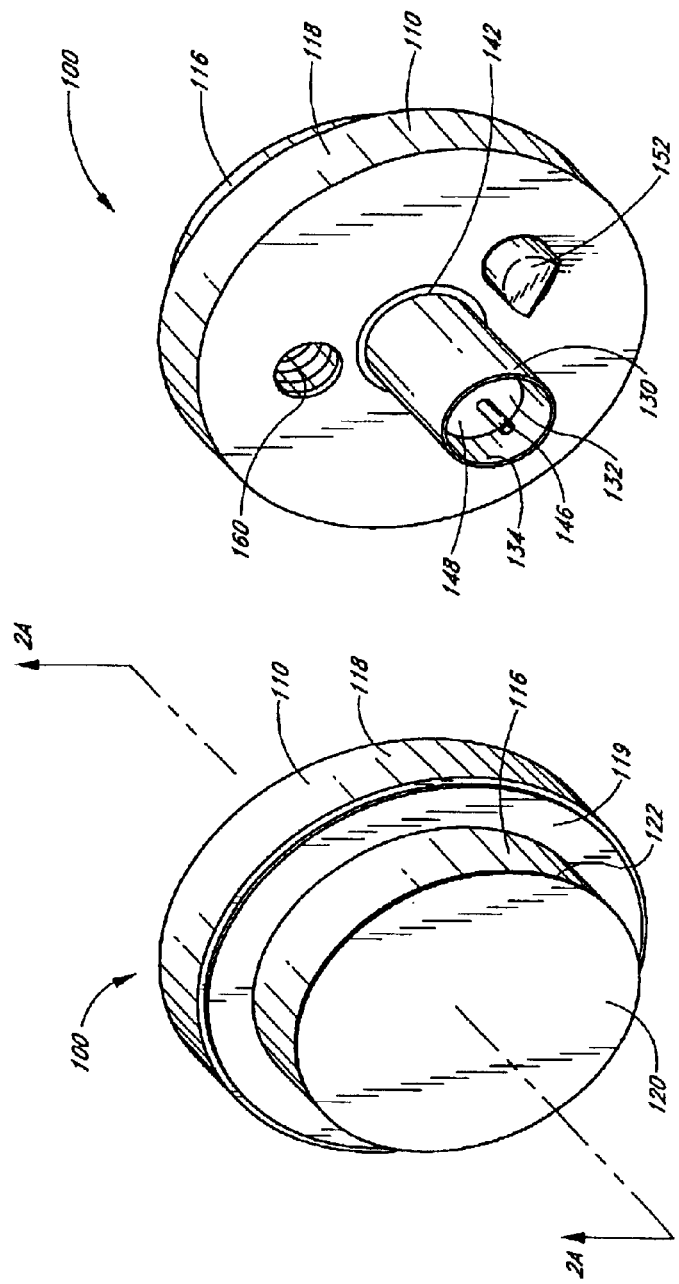
FIG. 1A illustrates a front perspective view of an embodiment of a capacitance diaphragm gauge (CDG) in accordance with the present invention, showing the pressure face of a flush diaphragm.
FIG. 1B illustrates a rear perspective view of the CDG of FIG. 1A showing the shielded electrode connection, the threaded hole for making electrical connection to the body of the CDG and the pinched-off evacuation tube.

FIGS. 1A, 1B, 2A, 2B, 3 and 4 illustrate an embodiment of a capacitance diaphragm gauge (CDG) 100. As shown in FIG. 1A, the CDG 100 includes a body structure 110, having a front surface 112 (see FIG. 4) and a rear surface 114 (see FIG. 4). In the embodiments illustrated herein, body structure 110 is generally cylindrical, and the front surface 112 and the rear surface 114 have circular shapes. In the preferred embodiments, the area of the front surface 112 is smaller than the area of the rear surface 114, and a forward cylindrical portion 116 of the body structure 110 proximate to the front surface 112 has a smaller diameter than a rearward cylindrical portion 118 proximate to the rear surface 114 such that the body structure 110 has a stepped transition from the front portion 116 to the rear portion 118 that forms a lip 119 around the front portion 116. The lip 119 may be used when mounting the CDG 100 in certain applications.

Figure 2A:
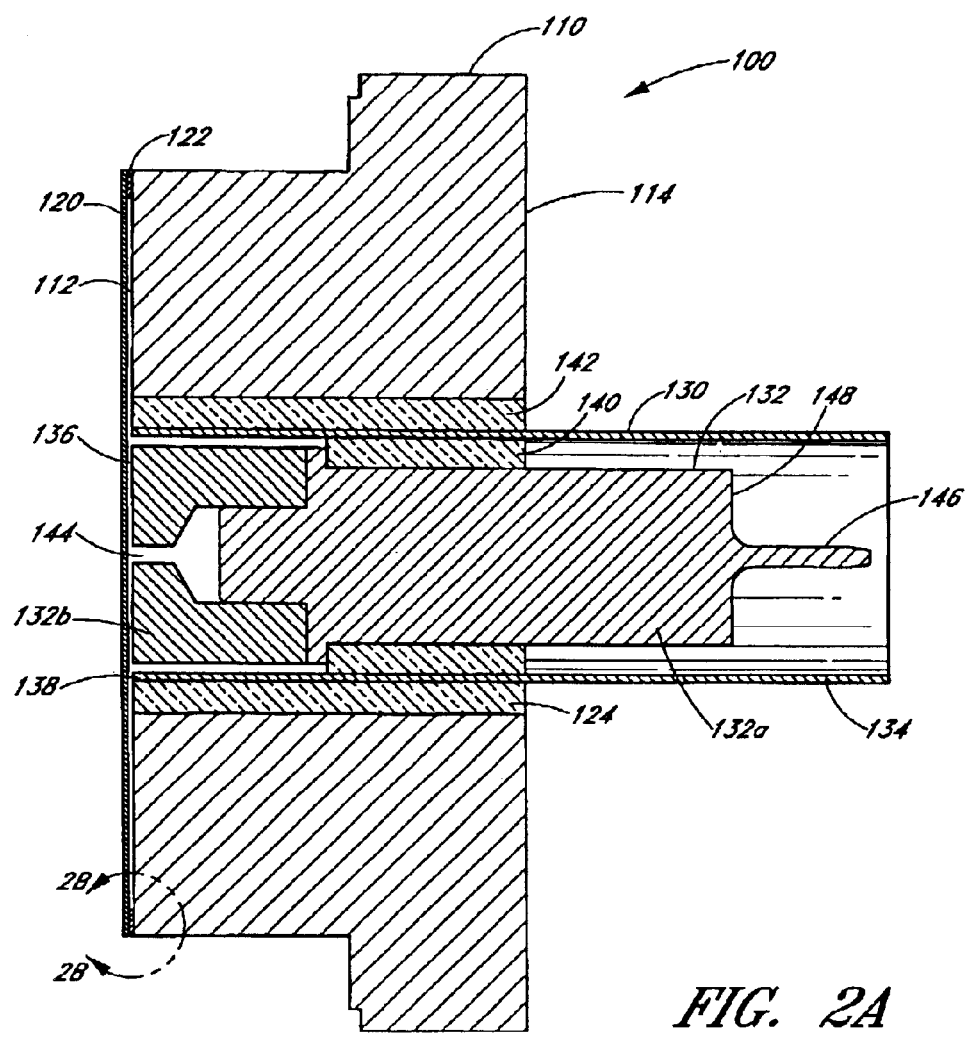
FIG. 2A illustrates a cross section of the CDG of FIG. 1A taken along the lines 2A—2A in FIG. 1A.
Figure 2B:
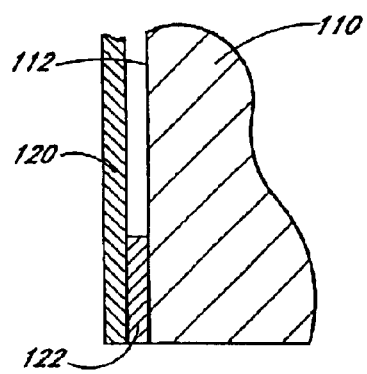
FIG. 2B illustrates an enlarged cross section of the CDG taken along the lines 2B—2B of FIG. 2A to show the shim between the diaphragm and the CDG body in more detail.
Figure 4:
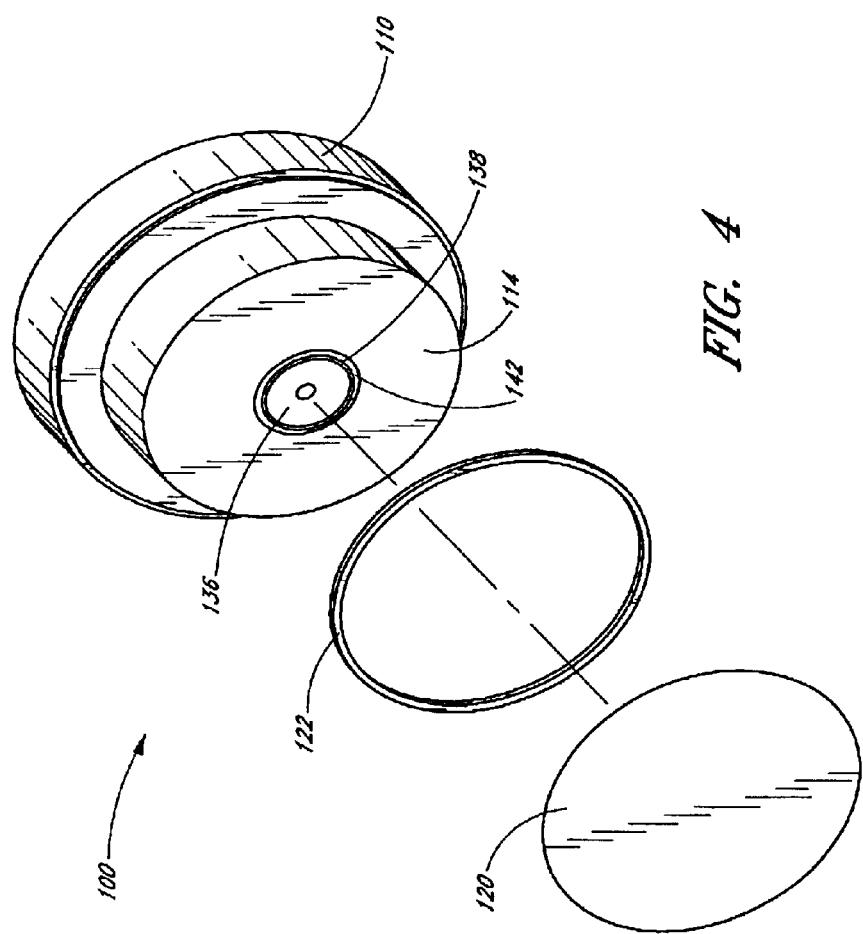
FIG. 4 illustrates an exploded front view of the CDG of FIGS. 1A and 1B showing the relationship between the diaphragm, the shim and the electrode.

A flush diaphragm 120 is mounted proximate to the front surface 112 of the body structure 110 and is spaced apart from the front surface 112 by a circular shim 122 (shown more clearly in FIGS. 2A, 2B and 4). The diaphragm 120 has a diameter of approximately 1 inch (2.54 cm) and has a thickness that can range from 0.001 inch (0.025 to 0.015 inch (0.38 mm). Preferably, the diaphragm 120 comprises Inconel 750 or another suitable material.

The circular shim 122 comprises Inconel 750 formed as a thin ring having an outer diameter of approximately 1 inch (2.54 cm) and an inner diameter of approximately 0.98 inch (2.49 cm). In a preferred embodiment, the shim 122 has a thickness of approximately 0.003 inch (0.08 mm). Thus, the diaphragm 120 is spaced from the front surface 112 by approximately 0.003 inch. In the preferred embodiment, the shim 122 is a separate unit as illustrated in the figures. The shim 122 forms a raised perimeter portion that bounds the flat front surface 112 of the body structure 110. In alternative embodiments, the shim 122 can be formed as part of the body structure 110 by machining or other suitable technique to form a raised perimeter portion around a substantially flat central portion of the front surface 112. The raised perimeter portion has an effective thickness measured perpendicular to the central portion of the front surface 112 that corresponds to the thickness of the shim 122, as discussed above.

As shown more clearly in FIGS. 2A and 4, a cylindrical bore 124 extends through the body structure 110 from the front surface 112 to the rear surface 114 and is generally centered with respect to both surfaces. An electrode assembly 130 extends through the cylindrical bore 124. The electrode assembly 130 comprises a cylindrical electrode 132 surrounded by a concentric electrode shield 134. The electrode assembly 130 is positioned through the cylindrical bore 124 so that a front surface 136 of the electrode 132 and a front surface 138 of the electrode shield 134 are substantially flush with the front surface 112 of the body structure 110, as shown in FIGS. 2A and 4.

As shown in FIG. 2A, the electrode 132 is electrically insulated from the electrode shield 134 by a first concentric insulator 140 positioned between the electrode 132 and the electrode shield 134. Similarly, the electrode shield 134 is electrically insulated from the wall of the bore 124 and is thus insulated from the body structure 110 by a second concentric insulator 142 positioned between the electrode shield 134 and the wall of the cylindrical bore 124.

Figure 3:
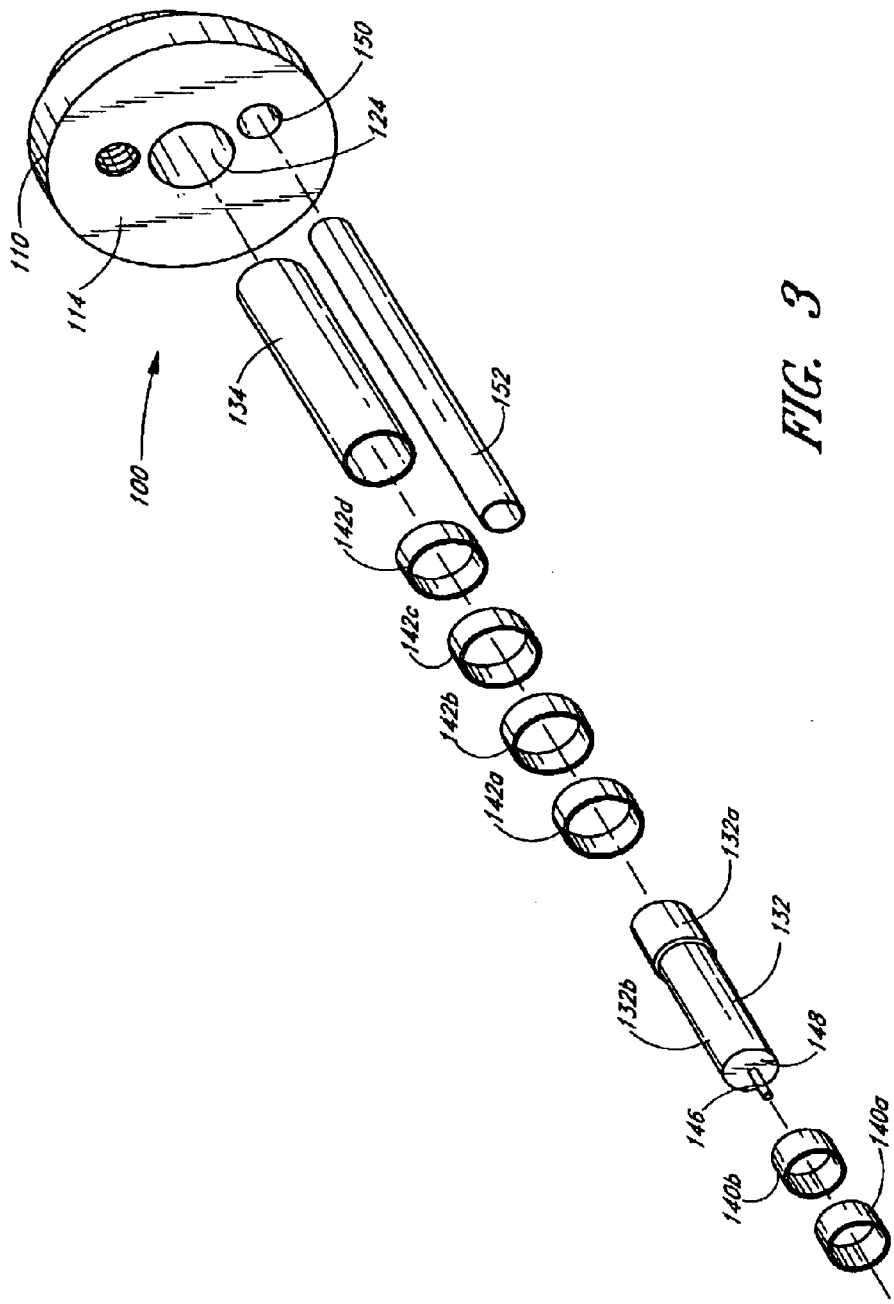
FIG. 3 illustrates an exploded rear perspective view of the CDG of FIGS. 1A and 1B showing the electrode, the electrode shield, the insulating glass preforms and the evacuation tube.

As illustrated in FIG. 3, the first concentric insulator 140 is advantageously formed by placing a first plurality of ring-shaped glass preforms 140a, 140b around a portion of the electrode 132, positioning the electrode shield 134 over the first plurality of glass preforms 140a, 140b. The second concentric insulator 142 is advantageously formed by placing a second plurality of glass preforms 142a, 142b, 142c, 142d around the electrode shield 134 and then positioning the electrode shield 134 within the cylindrical bore 124. The glass preforms 140a, 140b are sized to generally center the electrode 132 within the electrode shield 134, and the glass preforms 142a, 142b, 142c, 142d are generally sized to center the electrode shield 134 within the cylindrical bore 124.

The components are positioned as described in an alignment fixture (not shown). The front surface 136 of the electrode 132 advantageously includes a small opening 144 that is engageable with a pin (not shown) in the alignment fixture. Similarly, a hole (not shown) in the alignment fixture is engageable with a contact pin 146 extending from a rear surface 148 of the electrode 132. The opening 144 and the pin 146 maintain the electrode 132 in a substantially concentric position within the electrode shield 134 until the glass preforms 140a, 140b, 142a, 142b, 142c, 142d have been heated sufficiently to flow around the electrode 132 and the electrode shield 134 and have subsequently cooled. In certain preferred embodiments, the glass preforms, 140a, 140b, 142a, 142b, 142c, 142d advantageously comprise borosilicate glass that softens sufficiently at approximately 700° C. to flow around the components and form a permanent insulating bond.

After the body structure 110 has cooled, the front surface 112 of the body structure 110 is smoothed by lapping or other suitable method so that the front surface 136 of the electrode 132 is flush with the front surface 112.

In the preferred embodiment, the electrode 132 comprises a front portion 132a and a rear portion 132b. The rear portion 132b advantageously comprises titanium, which has a low coefficient of expansion in response to temperature. Thus, as the temperature is increased to cause the glass preforms to flow and subsequently decreased to form the permanent bond, the diameter of the rear portion 132b remains sufficiently constant that the glass bond formed around the rear portion 132b remains intact as the glass hardens.

In the preferred embodiment, the diaphragm 120, the shim 122 and the body structure 110 comprise Inconel 750 or other suitable material. The front portion 132a of the electrode 132 advantageously comprises nickel. The front portion 132a has a similar coefficient of expansion in response to temperature as the body structure 110, the diaphragm 120 and the shim 122. Thus, the front portion 132a expands and contracts substantially in proportion to the other components to thereby maintain a relatively fixed spacing with respect to the diaphragm 120. The electrode shield 134 also advantageously comprises nickel in order to have a similar coefficient of expansion.

Figure 5:
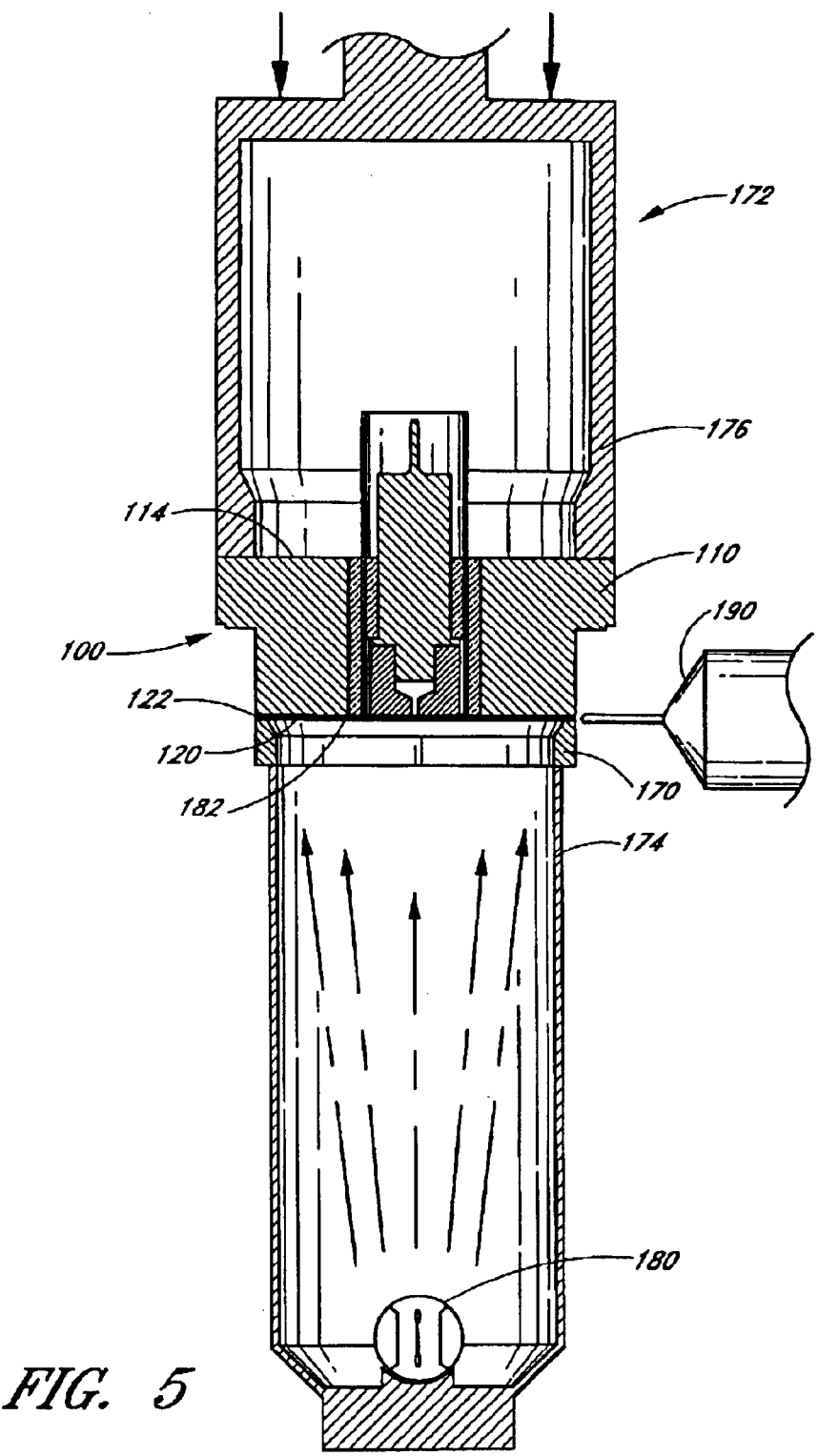
FIG. 5 illustrates a pictorial depiction in partial cross section of the CDG body, the shim and the diaphragm positioned on a reusable supporting ring in a hydraulic arbor press, which applies pressure while a radiation source applies radiation to heat the diaphragm during a welding process.

FIG. 5 illustrates a system for mounting the diaphragm 120 and the shim 122 to the body member 110. After the electrode 132 and electrode shield 134 are bonded to the each other and to the body structure 110, as described above, the shim 122 and the diaphragm 120 are welded to the front surface 112 of the body structure in a manner that pretensions the diaphragm 120. In particular, the shim 122 is positioned on the front surface 112 such that the outer perimeter of the shim 122 substantially conforms to the outer perimeter of the front surface 112. The circular diaphragm 120 is then positioned on the shim 122. A reusable, ring-shaped tooling jig (support jig) 170 is then positioned over the diaphragm 120.

The body structure 110, the shim 122, the diaphragm 120 and the tooling jig 170 are positioned in a hydraulic arbor press 172, a portion of which is shown in FIG. 5 in partial cross section. The tooling jig 170 rests on a cylindrical lower support surface 174 of the arbor press 170 with the diaphragm 120, the shim 122 and the body structure 110 resting on the tooling jig 170. A cylindrical upper pressure nose 176 of the arbor press 172 is positioned on the rear surface 114 of the body structure 110. A varying force is applied to the pressure nose 176 of the arbor 172 by hydraulic cylinders (not shown) or other conventional equipment to thereby squeeze the diaphragm 120 and the shim 122 between the perimeter of the front surface 112 and the tooling jig 170.

As further shown in FIG. 5, a source 180 of radiant energy is positioned below the diaphragm 120. For example, a halogen lamp 180 advantageously provides the radiant energy in the illustrated embodiment. The radiant energy is directed toward the diaphragm 120 to heat the diaphragm and cause the diaphragm to expand.

Since the diaphragm 120 comprises Inconel, which has a generally high reflectivity, a substantial portion of the radiant energy incident on the diaphragm 120 from the lamp 180 would ordinarily be reflected. In order to enhance the absorption of the radiant energy, the diaphragm is coated with a high emissivity material since a high emissivity material also readily absorbs radiant energy. On the other hand, many high emissivity coatings are difficult to remove from a surface. Any contaminating material remaining on the exposed surface of the diaphragm 120 would likely affect the performance of the diaphragm. In preferred embodiments, the exposed surface of the diaphragm 120 is coated with lamp black (e.g., soot) 182. For example, in one embodiment, the lamp black 182 is formed on the diaphragm 120 by positioning a butane flame (not shown) proximate the exposed surface. After permanently fixing the shim 122 and the diaphragm 120 to the body structure 110, as described below, the lamp black 182 is easily removed from the diaphragm with water or a mild cleaning solution without using abrasives or force that might damage the diaphragm 120.

Initially, a sufficient pressure is applied to the rear surface 114 of the body structure 110 to maintain the relative positions of the body structure 110, the shim 122 and the diaphragm 120 while the diaphragm 120 is heated by the radiant energy absorbed by the lamp black 182, thus causing the diaphragm 120 to expand. Full pressure is then applied to the assembled components to restrain the diaphragm 120 in the expanded configuration.

A welding head 190 is activated to fuse the diaphragm 120 and the shim 122 to the front surface 112 of the body structure 110. The welding head 190 revolves about the perimeter of the diaphragm in a conventional manner (e.g., electrical arc welding, laser welding, electron beam welding, or other suitable bonding processes) to form a continuous weld around the entire perimeter of the diaphragm 120. The diaphragm 120 and the shim 122 are secured to the body structure 110 to thereby form a sealed cavity between the inner surface of the diaphragm and the front surface 112 of the body structure.

The tooling jig 170 comprises a refractory metal or other suitable material (e.g., tantalum or silicon carbide) having a much higher melting temperature than the Inconel 750 material used for the body structure 110, the shim 122 and the diaphragm 120. Thus, the tooling jig 170 is not affected by the welding process and does not fuse with the other components. The welded components are readily removable from the tooling jig 170, and the same tooling jig 170 can be used multiple times.

When the lamp 180 is turned off, the diaphragm 120 gradually cools and contracts. However, since the outer perimeter of the diaphragm 120 is firmly secured to the body structure 110, which was not heated to any significant extent by the radiant energy, the surface of the diaphragm 120 effectively stretches and becomes pretensioned as it cools.

Because of the pretensioning introduced by the foregoing assembly method, the diaphragm 120 has very little hysteresis. When used in a pressure-sensing application, the pretensioning of the diaphragm 120 causes the diaphragm to return to its initial undeflected position after being deflected by pressure variations.

As further illustrated in FIGS. 1B and 3, a smaller through bore 150 extends from the front surface 112 to the rear surface 114. During assembly of the CDG 100, an evacuation tube 152 is mounted into the bore 150. After the CDG 100 is fully assembled, a very low pressure is applied to the evacuation tube 152 to remove any residual gases within a cavity formed between the front surface 112 and the diaphragm 120. The evacuation tube 152 is then pinched to form a cold weld and the excess portion of the evacuation tube 152 is removed to form a stub as shown in FIG. 1B.

The rear surface 114 further includes a threaded bore 160 that extends a selected depth into the body structure 110 but does not extend to the front surface 112. When the CDG 100 is installed in a pressure sensing application, an electrical connection (not shown) is attachable to the body structure 110 by engaging the threaded bore 160 with a screw (not shown) to thereby complete an electrical circuit to the diaphragm 120 via the body structure 110 and the shim 114. Thus, a first electrical connection is made to one plate of the variable capacitor formed by the diaphragm 120 and the front surface 136 of the electrode 132. A second electrical connection is made to the electrode 132 by engaging the pin 146 with the center contact of a coaxial connector (not shown). The shield contact of the coaxial connector engages the electrode shield 134.

Note that the cross section in FIG. 2A is selected so that the through bore 150, the evacuation tube 152 and the threaded bore 160 are not shown.

In some embodiments, an additional through bore (not shown) may be included to allow installation of a conventional getter can (not shown) to chemically remove any residual gas remaining after the evacuation process.

The structure of the CDG 100 and the method of pretensioning the diaphragm 120 permits CDGs to be manufactured with a wider range of pressure-sensing capabilities. For example, a diaphragm 120 having a diameter of approximately 1 inch (2.54 cm) and having a thickness of approximately 0.001 inch (0.025 mm) can be manufactured to measure pressures in a range extending from 0.0001 Torr to 1 Torr up to a range extending from 0.001 Torr to 10 Torr. A diaphragm 120 having a similar thickness and a diameter of approximately 2 inches (5.08 can be manufactured to measure pressures in a range extending from 0.00001 Torr to 0.1 up to a range extending from 0.001 Torr to 10 Torr.

The structure of the CDG 100 and the method of pretensioning the diaphragm 120 is particularly advantageous for manufacturing CDGs for measuring higher ranges of pressures using much diaphragms that are proportionately thicker with respect to their diameters.

Heretofore, CDGs having pretensioned flush diaphragms with very low hysteresis and having sufficient thicknesses to measure higher pressure ranges were not available at reasonable costs. The structure and method of the embodiments described herein provide low cost, very accurate flush diaphragms that can be manufactured for use in a variety of applications. For example, a diaphragm 120 having a diameter of approximately 0.75 inch (1.9 cm) and a thickness of 0.001 inch (0.025 mm) can be manufactured to measure pressures in a range extending from 0.01 Torr to 100 Torr. A diaphragm 120 having a diameter of approximately 0.75 inch (1.9 cm) and a thickness of 0.003 inch (0.076 mm) can be manufactured to measure pressures in a range extending from 0.1 Torr to 1,000 Torr. A diaphragm 120 having a diameter of approximately 0.75 inch (1.9 cm) and a thickness of 0.01 inch (0.254 mm) can be manufactured to measure pressures in a range extending from 1 Torr to 10,000 Torr.

Figure 6:
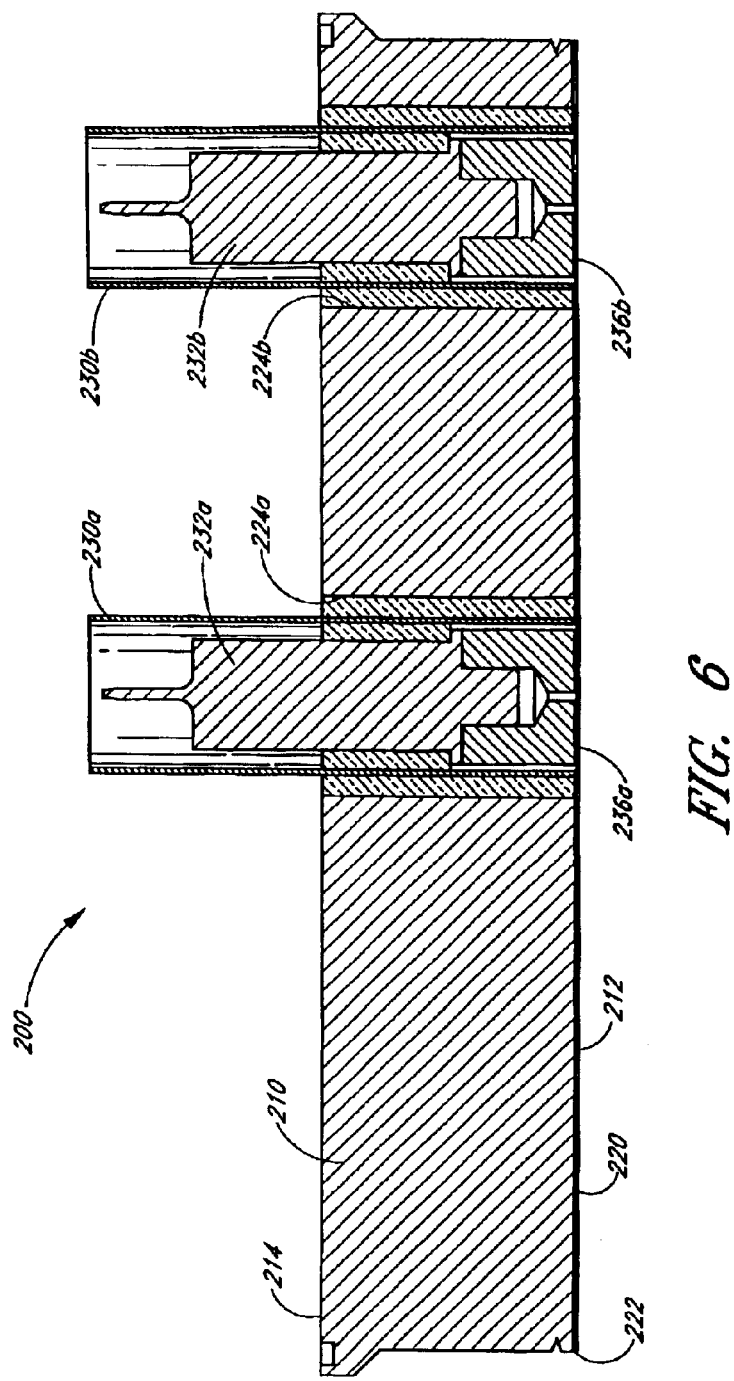
FIG. 6 illustrates a cross section of an alternative embodiment in accordance with the present invention in which two electrodes are provided in order to compensate for changes in the spacing between the diaphragm and the center electrode with temperature.

FIG. 6 illustrates a cross section of an alternative embodiment of a CDG 200 in accordance with the present invention in which two electrodes are provided in order to compensate for changes in the spacing between the diaphragm and the center electrode responsive to temperature variations. The embodiment of FIG. 6 is particularly advantageous for improving the performance of CDGs having larger diameter diaphragms (e.g., diameters on the order of 2 inches). The structure of the CDG 200 is similar to the structure of the CDG 100 described above, and like elements not specifically discussed below are not numbered in FIG. 6.

The CDG 200 includes a body structure 210 comprising Inconel 750. The body structure 210 is generally circular as was illustrated above for the body structure 110 of the CDG 100. The body structure 210 has a diameter of approximately 2 inches (5.08 cm). The body structure 210 has a front surface 212 and a rear surface 214.

A diaphragm 220 is positioned proximate to the front surface 212 and is spaced from the front surface 212 by a circular shim 222. The diaphragm 220 and the shim 222 are constructed as described above; however, the diameters are larger (e.g., 2 inches (5.08 cm) to correspond to the diameter of the body structure 210.

A first bore 224a extends through the body structure 210 from the center of the front surface 212 to the center of the rear surface 214. A second bore 224b extends through the body structure 210 in parallel to the first bore 224a. The second bore 224b is located near the perimeter of the front surface 212.

A first electrode assembly 230a is positioned within the first bore 224a, and a second electrode assembly 230b is positioned within the second bore 224b. Each of the electrode assemblies 230a, 230b is advantageously constructed in the manner described above with respect to the electrode assembly 130. In particular, the first electrode assembly 230a includes a first electrode 232a that has a first electrode front surface 236a, and the second electrode assembly 230b includes a second electrode 232b that has a second electrode front surface 236b.

The body structure 210 advantageously includes a through bore to accommodate a evacuation tube and a threaded bore to receive an electrical connection. These elements are not shown in FIG. 6; however, the elements correspond to like elements shown in FIG. 3.

The CDG 200 is assembled as described above in connection with the CDG 100 so that the diaphragm 220 is pretensioned across the front surface 212 of the body structure 210, and the cavity between the inner surface of the diaphragm 220 and the front surface 212 is evacuated and sealed.

The inclusion of the second electrode assembly 230b in the CDG 200 is particularly advantageous when a larger diameter diaphragm is used. As the temperature increases around the CDG 200, the shim 222 will tend to expand to cause the diaphragm 220 to move away from the front surface 212 proximate to the front surface 236a of the first electrode 232a. Thus, the capacitance between the first electrode 232a and the diaphragm 220 will change with temperature. Since the change in capacitance caused by temperature may not be readily distinguished from the change in capacitance caused by pressure, the measured capacitance may not accurately indicate the pressure.

Since the second electrode assembly 230b is located near the perimeter of the diaphragm 220 where the diaphragm 220 is secured to the front surface 212 via the shim 222, the spacing between the portion of the diaphragm 220 and the front surface 236b of the second electrode 232b changes very little in response to pressure changes. However, the spacing between the diaphragm 220 and the front surface 236b of the second electrode 232b changes substantially the same as the spacing between the diaphragm 220 and the front surface 236a of the first electrode 232a in response to temperature changes. Thus, the change in capacitance caused by the change in temperature is substantially the same for both electrodes. Therefore, the capacitance measurement taken between the diaphragm 220 and the first electrode 232a and the capacitance measurement taken between the diaphragm 220 and the second electrode 232b are used to compensate for the effect of temperature when the pressure is determined.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description. Any and all changes which come within the meaning and range of equivalency of the claims are to be considered within their scope.

What is claimed is:

1. A capacitance diaphragm manometer comprising:
   a body structure having a front surface and a rear surface;
   at least one electrode positioned through the body structure, the electrode having a front face substantially flush with the front surface;
   a ring-shaped shim positioned on the front surface of the body structure, the shim having a thickness; and
   a diaphragm having a first surface and a second surface, the first surface positioned on the shim and spaced apart from the front surface of the body structure by the thickness of the shim, the first surface of the diaphragm fixed to the shim under tension, the second surface of the diaphragm being a completely smooth and unobstructed exposed surface.

2. The capacitance diaphragm manometer as defined in claim 1, wherein the electrode comprises;
   a front portion comprising a material selected to have a first thermal expansion characteristic, the first thermal expansion characteristic being similar to a thermal expansion characteristic of the shim; and
   a rear portion comprising a material selected to have a second thermal expansion characteristic, the second thermal expansion characteristic being lower than the first thermal expansion characteristic.

3. A capacitance diaphragm manometer comprising:
   a body structure having a front surface and a rear surface, the front surface having a substantially flat central portion and being bounded by a raised perimeter portion having a thickness perpendicular to the flat central portion;
   at least one electrode positioned through the body structure, the electrode having a front face substantially flush with the front surface; and
   a diaphragm having a first surface and a second surface, the first surface positioned on the raised perimeter portion and spaced apart from the front surface of the body structure by the thickness of the raised perimeter portion, the first surface of the diaphragm fixed to the raised perimeter portion under tension, the second surface of the diaphragm being a completely smooth and unobstructed exposed surface.

4. The capacitance diaphragm manometer as defined in claim 3, wherein the raised perimeter portion comprises a ring-shaped shim, and wherein the raised perimeter portion is fixed to the front surface of the body structure when the diaphragm is fixed to the raised perimeter portion.

5. A capacitance diaphragm manometer comprising:
   a body structure having a front surface and a rear surface, the front surface having a substantially flat central portion and being bounded by a raised perimeter portion having a thickness perpendicular to the flat central portion;
   a first electrode positioned through the body structure, the first electrode having a cylindrical body with a front face substantially flush with the front surface, the first electrode being located approximately at the center of the front surface, the front face of the first electrode having a size and a shape;
   a second electrode positioned through the body structure, the second electrode having a cylindrical body with a front face substantially flush with the front surface, the second electrode being located proximate to the perimeter of the front surface, the front face of the second electrode having a size and a shape substantially the same as the size and the shape of the first electrode; and
   a diaphragm having a first surface and a second surface, the first surface positioned on the raised perimeter portion and spaced apart from the front surface of the body structure by the thickness of the raised perimeter portion, the first surface of the diaphragm fixed to the raised perimeter portion under tension, the second surface of the diaphragm being a completely smooth and unobstructed exposed surface.

6. The capacitance diaphragm manometer as defined in claim 5, wherein each of the first electrode and the second electrode comprises:
   a front portion comprising a material selected to have a first thermal expansion characteristic, the first thermal expansion characteristic being similar to a thermal expansion characteristic of the raised perimeter portion; and
   a rear portion comprising a material selected to have a second thermal expansion characteristic, the second thermal expansion characteristic being lower than the first thermal expansion characteristic.

* * * * *